US008930996B2

(12) United States Patent  
Mountain et al.

(10) Patent No.: US 8,930,996 B2  
(45) Date of Patent: Jan. 6, 2015

(54) APPARATUS, SYSTEMS AND METHODS FOR AUTOMATICALLY PRESENTING STORED MEDIA CONTENT AT ITS BEGINNING

(75) Inventors: Dale Mountain, Silsden (GB); Jonathan Capless, Bradford (GB)

(73) Assignee: EchoStar Technologies L.L.C., Englewood, CO (US)

( * ) Notice: Subject to any disclaimer, the term of this patent is extended or adjusted under 35 U.S.C. 154(b) by 226 days.

(21) Appl. No.: 12/940,735

(22) Filed: Nov. 5, 2010

(65) Prior Publication Data

US 2012/0117596 A1 May 10, 2012

(51) Int. Cl.
| | | |
|---|---|---|
| G06F 13/00 | (2006.01) | |
| H04N 21/482 | (2011.01) | |
| H04N 5/44 | (2011.01) | |
| H04N 5/445 | (2011.01) | |
| H04N 21/433 | (2011.01) | |
| H04N 21/462 | (2011.01) | |
| H04N 21/4722 | (2011.01) | |

(52) U.S. Cl.
CPC .......... *H04N 21/482* (2013.01); *H04N 5/4403* (2013.01); *H04N 5/44543* (2013.01); *H04N 21/4331* (2013.01); *H04N 21/4622* (2013.01); *H04N 21/4722* (2013.01)
USPC ................................ 725/39; 725/58; 386/298

(58) Field of Classification Search
CPC ............ H04N 21/482; H04N 21/4331; H04N 21/4622; H04N 21/4722; H04N 5/4403; H04N 5/44543
USPC ........................................ 725/39, 58; 386/298
See application file for complete search history.

(56) References Cited

U.S. PATENT DOCUMENTS

| | | | | |
|---|---|---|---|---|
| 5,682,597 A | * | 10/1997 | Ganek et al. ................. | 455/3.04 |
| 5,724,646 A | * | 3/1998 | Ganek et al. .................... | 725/89 |
| 6,049,333 A | * | 4/2000 | LaJoie et al. .................. | 715/718 |
| 6,263,504 B1 | * | 7/2001 | Ebisawa ........................ | 725/101 |
| 6,453,115 B1 | * | 9/2002 | Boyle ........................... | 386/351 |
| 6,798,971 B2 | * | 9/2004 | Potrebic ....................... | 386/298 |
| 7,409,140 B2 | * | 8/2008 | Rodriguez et al. ............ | 386/248 |
| 7,505,081 B2 | * | 3/2009 | Eshleman ..................... | 348/565 |
| 7,810,121 B2 | * | 10/2010 | Patel et al. ...................... | 725/58 |
| 2002/0174430 A1 | * | 11/2002 | Ellis et al. ....................... | 725/46 |
| 2002/0184638 A1 | * | 12/2002 | Agnihotri et al. .............. | 725/89 |
| 2003/0005454 A1 | * | 1/2003 | Rodriguez et al. ............. | 725/89 |
| 2003/0110514 A1 | * | 6/2003 | West et al. .................... | 725/134 |
| 2003/0177492 A1 | * | 9/2003 | Kanou ............................ | 725/39 |
| 2003/0208767 A1 | * | 11/2003 | Williamson et al. ............ | 725/93 |
| 2003/0226150 A1 | * | 12/2003 | Berberet et al. ................ | 725/94 |
| 2004/0078829 A1 | * | 4/2004 | Patel et al. .................... | 725/135 |
| 2004/0133923 A1 | * | 7/2004 | Watson et al. ................ | 725/134 |
| 2005/0034171 A1 | * | 2/2005 | Benya ........................... | 725/143 |
| 2008/0022347 A1 | * | 1/2008 | Cohen ........................... | 725/134 |

(Continued)

*Primary Examiner* — Nasser Goodarzi  
*Assistant Examiner* — Michael B Pierorazio  
(74) *Attorney, Agent, or Firm* — Lowe Graham Jones PLLC

(57) ABSTRACT

Media device systems and methods are operable to automatically present a program at its beginning while a remaining portion of the program is being received at the media device. An exemplary embodiment receives a program in a media content stream; receives a presentation request to present the program, wherein the presentation request is received after an initial portion of the program has been received and wherein the presentation request is received before a conclusion of the program; accesses a stored initial portion of the program from a memory medium; and initiates presentation at a beginning of the program residing in the accessed initial portion of the program.

19 Claims, 3 Drawing Sheets

(56) References Cited

U.S. PATENT DOCUMENTS

| | | | |
|---|---|---|---|
| 2008/0092181 A1* | 4/2008 | Britt | 725/87 |
| 2008/0127253 A1* | 5/2008 | Zhang et al. | 725/35 |
| 2008/0184297 A1* | 7/2008 | Ellis et al. | 725/39 |
| 2009/0025027 A1* | 1/2009 | Craner | 725/32 |
| 2009/0150941 A1* | 6/2009 | Riedl et al. | 725/61 |
| 2009/0320084 A1* | 12/2009 | Azam et al. | 725/120 |
| 2009/0324203 A1* | 12/2009 | Wiklof | 386/96 |
| 2010/0043022 A1* | 2/2010 | Kaftan | 725/34 |
| 2010/0095323 A1* | 4/2010 | Williamson et al. | 725/32 |
| 2010/0217613 A1* | 8/2010 | Kelly | 705/1.1 |
| 2010/0218208 A1* | 8/2010 | Holden | 725/32 |
| 2010/0242079 A1* | 9/2010 | Riedl et al. | 725/115 |
| 2010/0246582 A1* | 9/2010 | Salinger et al. | 370/392 |
| 2010/0251304 A1* | 9/2010 | Donoghue et al. | 725/46 |
| 2010/0251305 A1* | 9/2010 | Kimble et al. | 725/46 |
| 2010/0254386 A1* | 10/2010 | Salinger et al. | 370/392 |
| 2010/0269146 A1* | 10/2010 | Britt | 725/110 |
| 2010/0293583 A1* | 11/2010 | Loebig et al. | 725/109 |
| 2010/0306401 A1* | 12/2010 | Gilson | 709/231 |

* cited by examiner

APPARATUS, SYSTEMS AND METHODS FOR AUTOMATICALLY PRESENTING STORED MEDIA CONTENT AT ITS BEGINNING

BACKGROUND

Media devices, such as a set top box, or the like, are configured to receive media content from a content provider. The media content is typically provided as a stream of information. The streaming media content provides a series of programs, such as movies, sporting events, television series, newscast programs, etc.

The media device may be configured to store the received media content for later presentation. For example, the media device may include, or be coupled to, a digital video recorder (DVR) or a recordable digital video disk (DVD) player. At some later time, a user can operate the media device, DVD player, or other device to cause retrieval and presentation of the stored media content.

At times, the user may be watching, in real time, a particular program of interest that is contained in the media content that is currently being received by the media device. In some situations, the user may choose to initiate presentation of the currently presented program of interest after its beginning. Accordingly, the user will not be able to view the missed initial portion of the program of interest.

However, in the event that the user has pre-configured their DVR or DVD player to store the program of interest in its respective memory medium, the user can access the initial portion of the stored program of interest to view the program of interest from its beginning. As the user is viewing the initial portion of the program of interest, the remaining portion of the program of interest continues to be stored into the memory medium of the DVR or DVD player as it is being received by the media device.

There are different ways of providing user access to the initial portion of the stored program of interest. In some systems, the user may navigate through a presented electronic program guide (EPG) menu that provides a listing of programs stored in the memory medium of the DVR, the DVD player, or a video on demand system (VOD). The user may then select the program of interest, via the EPG menu, to initiate presentation of the initial portion of the program of interest. However, the process of navigating through the EPG menu to identify and then select the stored program of interest may be relatively tedious and time consuming.

Alternatively, or additionally, some systems may be configured to permit the user to rewind back through the saved initial portion of the program of interest so that presentation can be resumed from the beginning. In such systems, the user is initially presented the currently received portion of the program of interest. Upon actuation of a rewind function, the media device automatically accesses the stored initial portion of the program of interest and begins to present a fast speed rewind of the stored program of interest. Thus, the user can view the reverse motion presentation, and at a point of interest, may then initiate presentation of the stored program of interest. However, this process may take some amount of time to rewind back through to the beginning of the stored program of interest. Further, a specific series of actions are required on the part of the user. Accordingly, this process may also be relatively tedious and time consuming.

Accordingly, there is a need in the arts to provide a system and method for more convenient access to a stored initial portion of a program of interest that is currently being received by a media device.

SUMMARY

Systems and methods of automatically presenting a program at its beginning while a remaining portion of the program is being received at the media device are disclosed. An exemplary embodiment receives a program in a media content stream; receives a presentation request to present the program, wherein the presentation request is received after an initial portion of the program has been received and wherein the presentation request is received before a conclusion of the program; accesses a stored initial portion of the program from a memory medium; and initiates presentation at a beginning of the program residing in the accessed initial portion of the program.

BRIEF DESCRIPTION OF THE DRAWINGS

Preferred and alternative embodiments are described in detail below with reference to the following drawings.

DETAILED DESCRIPTION

Figure 1:
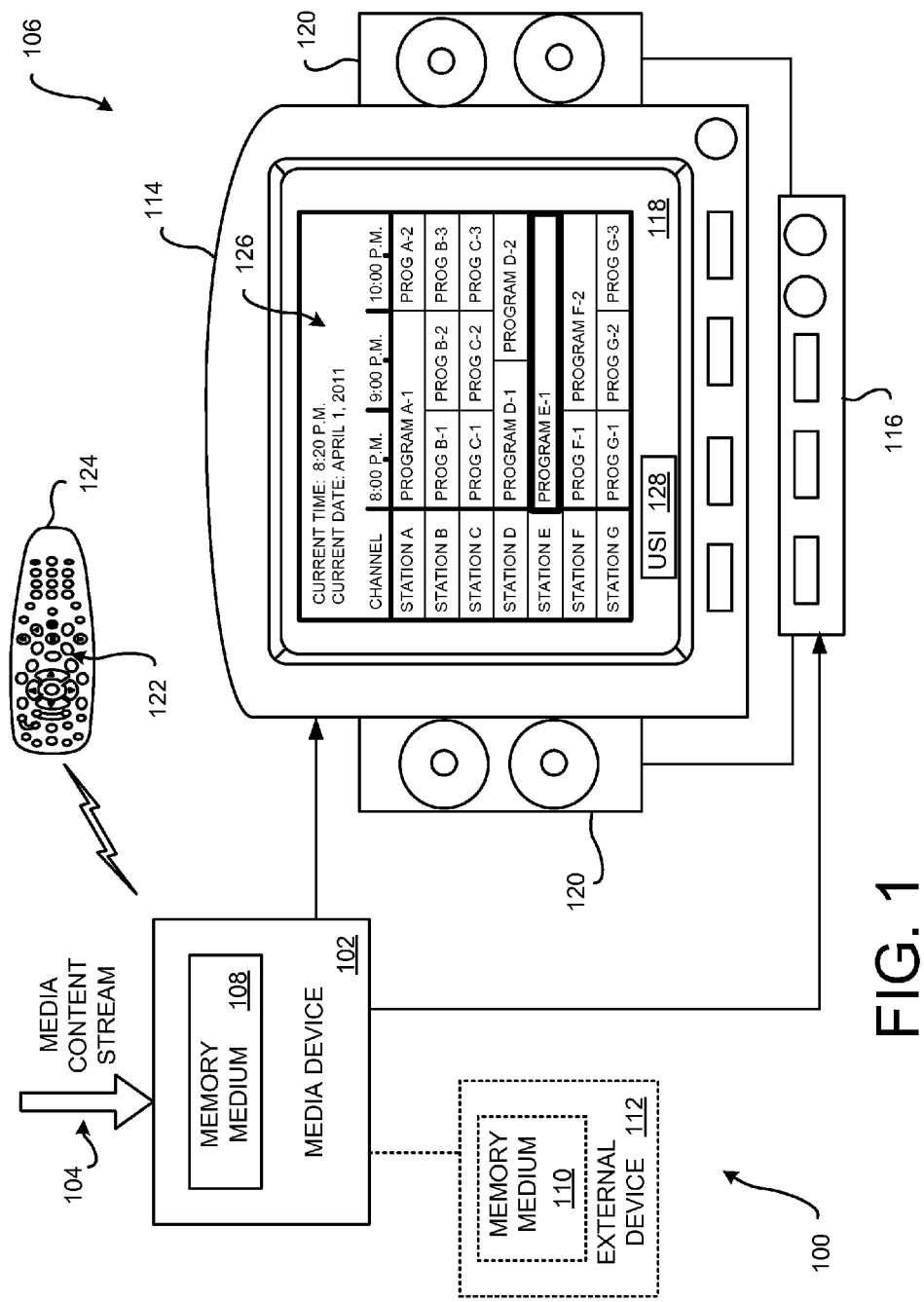
FIG. 1 is a block diagram of an embodiment of an automatic rewind system implemented in a media device.

FIG. 1 is a block diagram of an embodiment of an automatic rewind system 100 implemented in a media device 102, such as, but not limited to, a set top box (STB). Embodiments of the automatic rewind system 100 may be implemented in other media devices, such as, but not limited to digital video disc (DVD) players, digital video recorders (DVRs), game playing devices, or personal computers (PCs) that are configured to receive one or more live feed media content streams 104.

The received media content stream 104 may comprise one or more streaming types of programs. Exemplary programs may include movies, made-for-television program series, local programming, and/or special events. A user (not shown) is able to cause the media device 102 to store a selected program of interest in a memory medium 108, for example, but not limited to, a memory medium residing in the media device 102. Alternatively, or additionally, the selected program of interest may be stored in a memory medium 110 accessible by an external device 112, such as a DVD recorder, a personal computer, a cloud computing server, or the like.

In an exemplary embodiment, a user selects a program of interest for storing into the memory medium 108 (or the memory medium 110). In some instances, the user will configure the media device 102 in advance of the scheduled presentation time of the program of interest. In other instances, the user will initiate storage as the program of interest is currently being received in the media content stream 104.

In instances where the initial portion of the program of interest has been received and saved into the memory medium 108 (or the memory medium 110), but prior to the conclusion of presentation of the program of interest, embodiments of the automatic rewind system 100 are configured to automatically access the stored initial portion of the program of interest and automatically initiate presentation of the program of interest at its beginning. The automatic access and presentation occurs in response to receiving a user presentation request that selects the currently presented program of interest for presentation. That is, the beginning of the program of interest is automatically accessed and presented without additional interaction, or with relatively minimal interaction, from the user.

The exemplary media device 102 is coupled to a media presentation system 106 that includes a visual display device 114, such as a television (hereafter, generically a TV), and an audio presentation device 116, such as a surround sound receiver (hereafter, generically, a speaker). Other types of output devices may also be coupled to the media device 102, including those providing any sort of stimuli sensible by a human being, such as temperature, vibration and the like. Further, take for example that the media content stream 104 is, or includes, a "live feed" program that is currently being presented to the user. The user may watch the video portion of the currently presented live feed program on the display 118 of the TV 114 as it is being received in real time by the media device 102. Further, the user may also listen to the audio portion of the currently presented live feed program that is reproduced as sounds by the speakers 120 of the surround sound receiver 116.

At some point during the presentation of the current program, the user may decide that they would like to change to a different program. To view alternative viewing choices, the user may operate the media device 102 such that an electronic program guide (EPG) 126 is presented on the display 118 of the TV 114.

For example, the user may be interested in viewing the "Program E-1" (which is indicated as being highlighted by the bold-lining of the EPG menu box). In this example, the user would "scroll" or "navigate" about the EPG 126 to the "Program E-1" box using one or more of the controllers 122 on the remote control 124 to initiate presentation of the "Program E-1".

In this example, the "Program E-1" started at 8:00 p.m. Since the current time is 8:20 p.m. as indicated on the exemplary EPG 126, "Program E-1" has already started. When the user selects the "Program E-1" for presentation, in the absence of an embodiment of the automatic rewind system 100, the "Program E-1" is immediately presented beginning with the currently received content that is being received by the media device 102 at 8:20 p.m. In this example, the user misses the initial portion of the "Program E-1" from 8:00-8:20 p.m.

Exemplary embodiments of the automatic rewind system 100 implemented in the media device 102 automatically initiate presentation of the "Program E-1" at its beginning. In this example, in response to selection of "Program E-1" by the user, the initial portion of the stored "Program E-1" is accessed from the memory medium 108 of the media device 102 (or the memory medium 110 of the external device 112) and the stored program is presented to the user at its beginning. The remaining portion of the "Program E-1" is continued to be stored in the memory medium 108 (or the memory medium 110) so that as time progresses, the user is presented the "Program E-1" in its entirety.

Some embodiments may be configured to present a user selection interface (USI) 128, such as a selectable button, a pull-down box, a pop-up window or the like, to the user when the program of interest is selected by the user. The user selection interface 128 indicates to the user the availability of the initial portion of the selected program of interest. The user selection interface 128 is further configured to receive user input, or user confirmation, to initiate presentation of the selected program of interest at its beginning. That is, the user selection interface 128 permits the user to decide whether they wish to begin presentation of the selected program of interest at its current real time point, or to begin presentation of the program from its beginning.

For example, the selected program of interest may be a local newscast program that typically presents stories on sensational national media events before presenting report segments pertaining to local news, local sports and/or local weather. If the user is not particularly interested in the national news segments, which were likely previously covered in an earlier presented national newscast program, the user can initiate presentation at the selected program of interest at the current real-time point. On the other hand, if the user did not view the previously presented national newscast program, the user may choose to initiate presentation of the local newscast program at its beginning for viewing of the national news segments.

Figure 2:
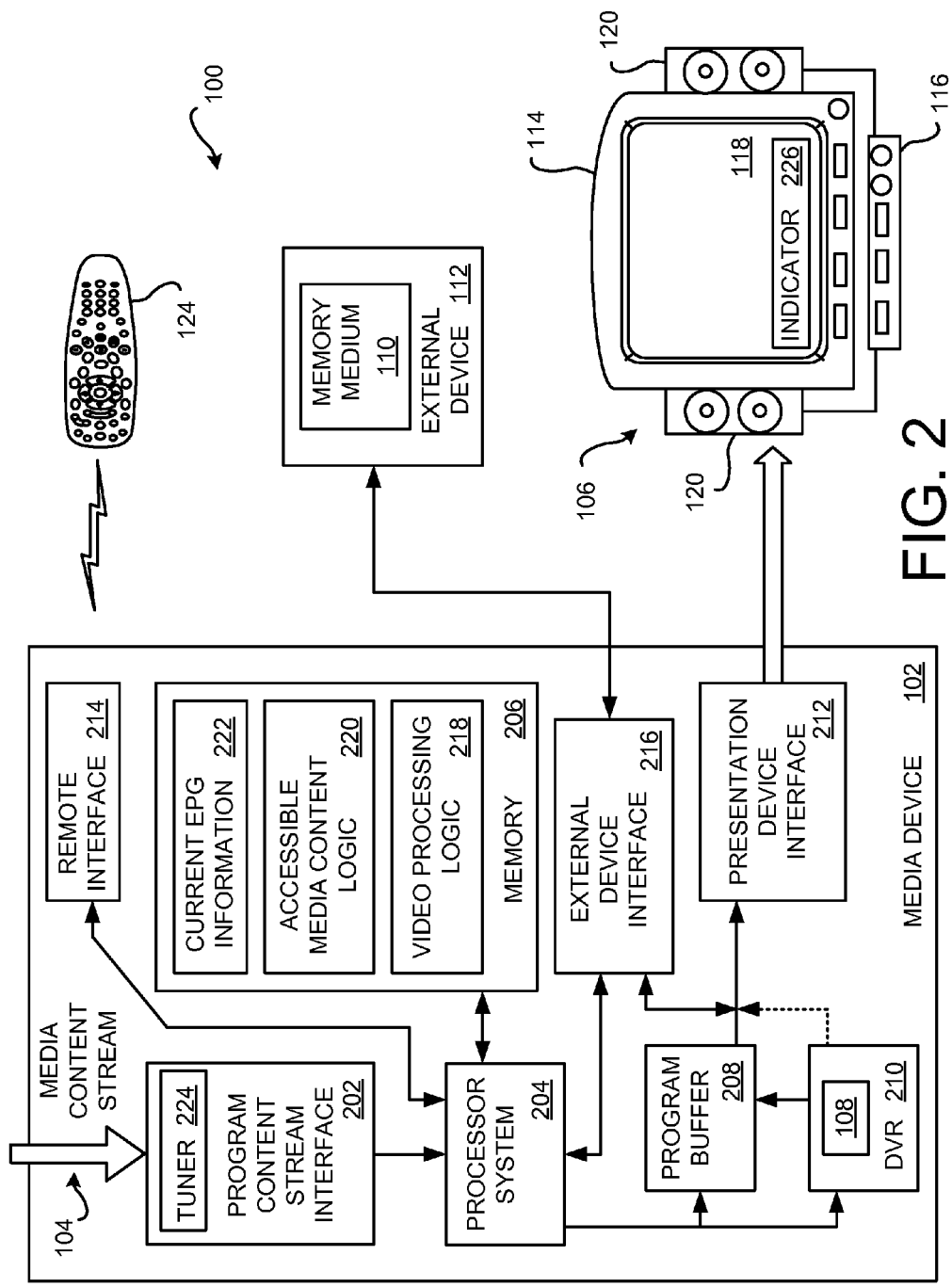
FIG. 2 is a block diagram of the automatic rewind system implemented in a set top box.

FIG. 2 is a block diagram of the automatic rewind system 100 implemented in the exemplary media device 102. The non-limiting exemplary media device 102 comprises a program content stream interface 202, a processor system 204, a memory 206, a program buffer 208, an optional digital video recorder (DVR) 210, a presentation device interface 212, a remote interface 214, and an optional external device interface 216. The memory 206 comprises portions for storing the video processing logic 218, the stored media content access logic 220, and electronic program guide (EPG) information 222. In some embodiments, the video processing logic 218 and the stored media content access logic 220 may be integrated together, and/or may be integrated with other logic. In other embodiments, some or all of these memory and other data manipulation functions may be provided by and using remote server or other electronic devices suitably connected via the Internet or otherwise to a client device. In the exemplary media device 102, the memory medium 108 that is configured to store selected programs resides in, or is integrated with, the DVR 210. Further, additional components not described herein may be included in alternative embodiments.

The functionality of the media device 102, here a set top box, is now broadly described. A media content provider provides a plurality of programs that are received in one or more media content streams 104. The media content streams 104 are received by the program content stream interface 202. One or more tuners 224 in the program content stream interface 202 selectively tune to one of the media content streams 104 providing the program of interest that the user is interested in viewing. The processor system 204, executing the video processing logic 218 and based upon a request for a program of interest specified by a user, parses out program content from the received media content stream 104 that is associated with the selected program of interest. The selected program of interest is then assembled into a stream of video and/or audio information which may be stored by the program buffer 110 such that the program content is streamed out to the media presentation system 106 via the presentation device interface 212. Alternatively, or additionally, the selected program of interest may be saved into the DVR 210 for later presentation. The DVR 210 may be directly provided in, locally connected to, or remotely connected to, the media device 102.

When the user is interested in viewing a program of interest, the user actuates the remote control 124 to cause the processor system 204 to retrieve and present the EPG 126 on the display 118. The user may then select from the presented EPG 126 the program of interest that is currently being received in the media content stream 104. In the instance where the program of interest has been previously stored in the DVR 210, or has at least the initial portion stored in the DVR 210, the automatic rewind system 100 automatically accesses the stored initial portion of the program of interest, and initiates presentation of the program of interest at its beginning using the accessed initial portion of the program of interest.

In some embodiments, the media device 102 may be communicatively coupled to the external device 112, via the external device interface 216. The user may elect to store the program of interest into the memory medium 110 that is accessible by the external device 112. Accordingly, the processor system 204 may operate the program buffer 208 and/or the DVR 210 so that the program of interest is communicated to the external device 112 for storage. The processor system 204 may also communicate instructions to the external device 112 to control, or partially control, operation of the external device 112.

In situations where a user presentation request is received to initiate presentation of a currently received program of interest that has at least its initial portion stored in the memory medium 110 that is accessible by the external device 112, embodiments of the automatic rewind system 100 cause the processor system 204 to communicate instructions to the external device 112 to access the program of interest. The stored program of interest is accessed from the memory medium 110, at its beginning, and is communicated to the media device 102. The media device 102 then initiates presentation of the selected program of interest at its beginning using the received initial portion of the program of interest.

In some instances, the entirety of the program of interest is stored in the memory medium 110 that is accessible by the external device 112. For example, the external device 112 may be a DVD player and/or recorder, and the program of interest may be stored on a DVD. Accordingly, the entire stored program of interest is accessed from the memory medium 110 and is communicated to the media device 102. The media device 102 then initiates presentation of the beginning of the program of interest that is received from the external device 112. In some embodiments, the external device 112 and/or the media device 102 may be provided by any combination of hardware and/or software, including, but not limited, to a cloud computing server and or other server-based system. Such media devices 102 and/or external device 112 may be suitably connected to such server-based systems in any suitable manner.

Some embodiments are configured to present an indicator 226 on the display 118 of the TV 114. The indicator 226 indicates to the user that they are viewing the selected program of interest as a live feed program, or that they are viewing the recorded initial portion of the selected program of interest. The indicator 226 may be a message and/or meaningful icon that is presented on the display 118 of the TV 114. In some embodiments, the presented indicator 226 may a partially transparent watermark that is presented over a portion of the presented program of interest. Alternatively, or additionally, the indicator 226 may be an illumination device, such as a light emitting diode, lamp or the like, located on the surface of the remote control 124, the media device 102, the TV 114, or the like.

Figure 3:
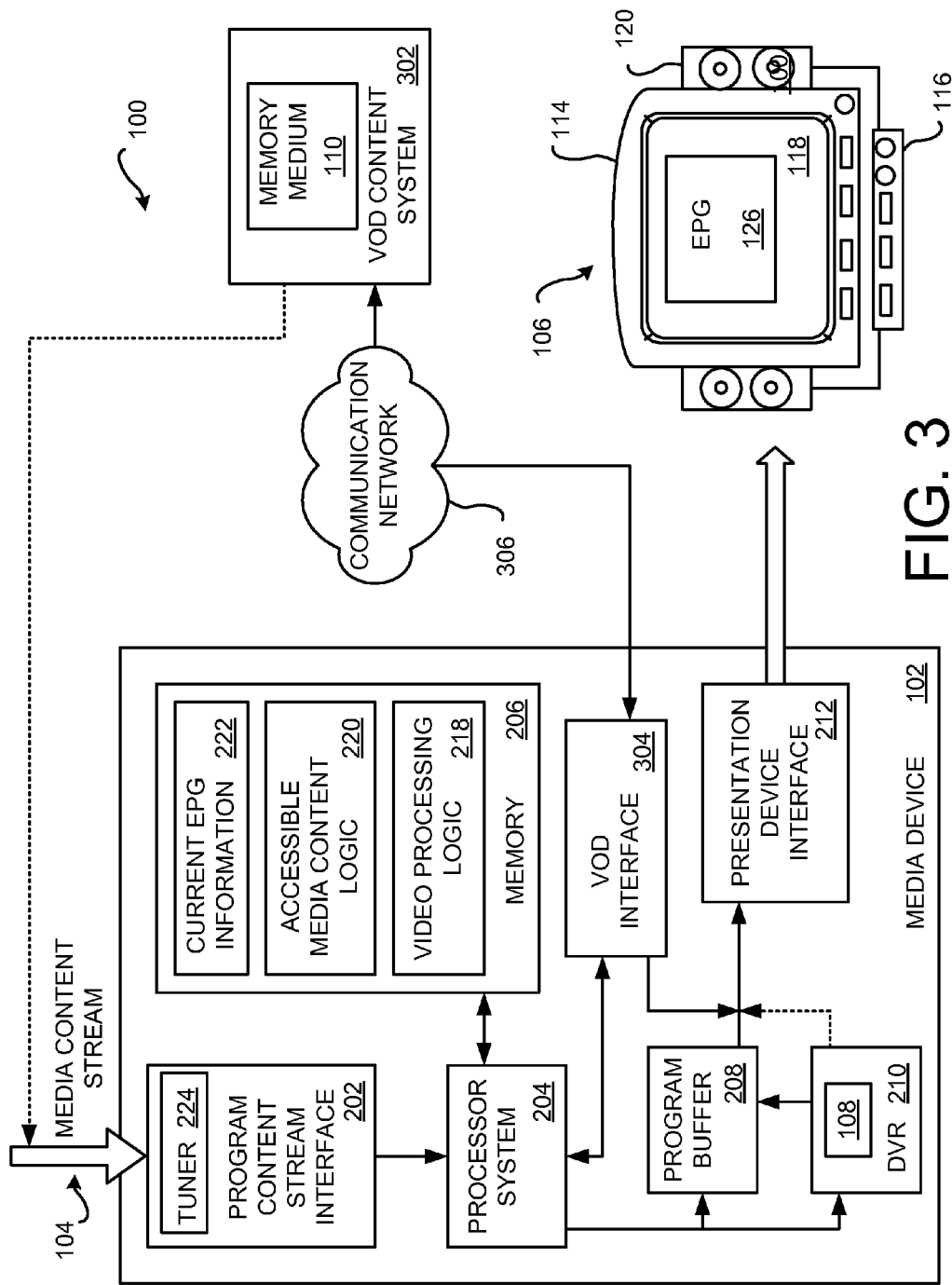
FIG. 3 is a block diagram of the automatic rewind system implemented in an exemplary media device that is configured to access a video on demand system.

FIG. 3 is a block diagram of the automatic rewind system 100 implemented in an exemplary media device 102 that is configured to access a video on demand (VOD) content system 302. In this exemplary embodiment, the media device 102 and the VOD content system 302 are communicatively coupled together via the communication network 306. The communication network 306 is illustrated as a generic communication system. In an exemplary embodiment, the communication network 306 comprises the Internet. Accordingly, the exemplary VOD interface 304 is a suitable modem or Internet connection device.

Alternatively, the communication network 306 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be configured to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, the communication network 306 may be employ combination systems having a plurality of segments which employ different formats for each segment, and/or may employ different technologies on different segments.

In some situations, the user may initiate presentation of a currently received program of interest, such as by selecting the program of interest using the presented EPG 126. However, the program of interest may also be available from the VOD content system 302. Some embodiments of the automatic rewind system 100 cause the processor system 204 to communicate a request to the VOD content system 302 to access the program of interest residing in the memory medium 110 in response to the user selecting the currently presented program of interest from the EPG 126.

The program of interest stored on the VOD content system 302 is accessed from the memory medium 110, at its beginning, and is communicated to the media device 102. In an exemplary embodiment, the stored program of interest may be communicated to the media device 102 in the media content stream 104. Alternatively, the stored program of interest may be communicated to the media device 102 via the communication network 306. The media device 102 then initiates presentation of the selected program of interest at its beginning using the received initial portion of the program of interest.

In this exemplary embodiment, the user does not have to be aware of the availability of their selected program of interest in the VOD content system 302, stop presentation of the currently received selected program of interest, access the VOD content system 302, locate the program of interest in the VOD content system 302, and then finally operate the VOD content system 302 to provide their selected program of interest to the media device 102. Rather, embodiments of the automatic rewind system 100 are configured to automatically access and present the selected program of interest that is available from the VOD content system 302. Accordingly, inconvenience to the user is avoided since the user does not have to manually access the program of interest from the VOD content system 302. Further, the user may be provided a richer viewing experience in situations where the program of interest is a higher quality program, such as a high definition version, as compared to situations where the currently received version of the program of interest is a standard version interlaced with commercials and other program presentation interrupting segments.

In an alternative embodiment, only the initial portion of the program of interest is received from the VOD content system 302 and is automatically presented to the user. The remaining portion of the program of interest is stored in the DVR 210 as it is being received in the media content stream 104. The stored remaining portion of the program is accessed from the DVR 210 and presented upon conclusion of presentation of the received initial portion of the program received from the VOD content system 302. Accordingly, bandwidth that would otherwise be used over the communication network 306 to communicate the entire program of interest from the VOD content system 302 to the media device 102 is conserved.

Some embodiments are configured to permit the user to enable or disable the automatic rewind system 100. In an exemplary embodiment, the automatic rewind system 100 may be enabled/disabled by the user via a control menu. A selection box or the like may be presented on the menu. The selection box may indicate the current operating status of the automatic rewind system 100 (enabled or disabled), and provide a selection area that will either enable or disable the automatic rewind system 100. Alternatively, or additionally, one or more of the controllers 122 on the remote control 124 may be actuated by the user to enable or disable the automatic rewind system 100. Operation of the controllers 122 may be used in conjunction with the control menu that indicates the operating status of the automatic rewind system 100.

It should be emphasized that the above-described embodiments of the automatic rewind system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for presenting a previously scheduled program received in a media content stream, wherein the media content stream is received at a media device, the method comprising:
receiving, at the media device, a user request to store the previously scheduled program in a memory medium of the media device when the previously scheduled program in the media content stream is received at the media device, wherein the user request is made in advance of a scheduled presentation time of the previously scheduled program;
receiving a plurality of programs in the media content stream at the media device, wherein the previously scheduled program is one of the plurality of received programs;
storing an initial portion of the previously scheduled program in the memory medium of the media device as the previously scheduled program is being received in the media content stream at the media device;
receiving a presentation request to present the previously scheduled program at the media device, wherein the previously scheduled program is one of the plurality of programs indicated on a presented EPG that are currently scheduled for presentation, wherein the presentation request is based on the user's selection of the previously scheduled program via the presented EPG, wherein the presentation request is received after the initial portion of the previously scheduled program has been received at the media device and has been stored in the memory medium of the media device, and wherein the presentation request is received before a conclusion of the previously scheduled program;
accessing the stored initial portion of the previously scheduled program from the memory medium, wherein the stored initial portion of the previously scheduled program is automatically accessed in response to receiving the user's presentation request made via the presented EPG when the initial portion of the previously scheduled program has been stored in the memory medium of the media device; and
initiating presentation at a beginning of the previously scheduled program residing in the accessed initial portion of the previously scheduled program, wherein the presentation is automatically initiated in response to automatically accessing the stored initial portion of the previously scheduled program from the memory medium of the media device.

2. The method of claim 1, further comprising:
wherein the storing of the initial portion of the previously scheduled program occurs prior to receiving the user's presentation request made via the presented EPG.

3. The method of claim 1, wherein the memory medium of the media device is a first memory medium, and further comprising:
storing a remaining portion of the previously scheduled program received in the media content stream in a second memory medium,
wherein the storing of the remaining portion of the previously scheduled program is automatically initiated in response to receiving the user's presentation request made via the presented EPG, and
wherein the stored remaining portion of the previously scheduled program is accessed from the second memory medium and presented upon conclusion of presentation of the initial portion of the previously scheduled program.

4. The method of claim 1, further comprising:
storing a remaining portion of the previously scheduled program in the memory medium,
wherein the storing of the remaining portion of the previously scheduled program is automatically initiated in response to receiving the user's presentation request made via the presented EPG, and
wherein the stored remaining portion of the previously scheduled program is accessed from the memory medium and presented upon conclusion of presentation of the initial portion of the previously scheduled program.

5. The method of claim 1, wherein the memory medium of the media device is an external memory medium communicatively coupled to the media device, and further comprising:
storing at least the initial portion of the previously scheduled program in the external memory medium prior to receiving the user's presentation request made via the presented EPG;
communicating a request to the external memory medium to access the stored initial portion of the previously scheduled program, wherein the request to the external memory medium is communicated in response to receiving the user's presentation request made via the presented EPG; and
receiving at least the initial portion of the previously scheduled program from the external memory medium.

6. The method of claim 5, further comprising:
storing a remaining portion of the previously scheduled program in the external memory medium, wherein the storing of the remaining portion of the previously scheduled program in the external memory medium is automatically initiated in response to receiving the user's presentation request made via the presented EPG; and
receiving the stored remaining portion of the previously scheduled program from the external memory medium upon conclusion of presentation of the received initial portion of the previously scheduled program.

7. The method of claim 5, further comprising:
storing a remaining portion of the previously scheduled program received in the media content stream in a digital video recorder (DVR) residing in the media device, wherein the storing of the remaining portion of the previously scheduled program is automatically initiated in response to receiving the user's presentation request made via the presented EPG; and
presenting the stored remaining portion of the previously scheduled program upon conclusion of presentation of the initial portion of the previously scheduled program.

8. The method of claim 1, wherein the previously scheduled program is stored in the memory medium in its entirety prior to receiving the presentation request made via the presented EPG, and wherein initiating presentation at the beginning of the previously scheduled program further comprises:
presenting the entire stored previously scheduled program, wherein the presentation of the stored previously scheduled program is automatically initiated at the beginning of the stored previously scheduled program in response to receiving the user's presentation request made via the presented EPG.

9. The method of claim 1, further comprising:
presenting a user selection interface with the presented EPG, wherein the user selection interface indicates to the user that the user's presentation request made via the presented EPG to begin presentation at the beginning of the previously scheduled program will occur in response to receiving the user's presentation request made via the presented EPG.

10. The method of claim 1, further comprising:
presenting a user selection interface in response to the user's presentation request made via the presented EPG, wherein the user selection interface is configured to receive a user's selection between one of beginning presentation of the previously scheduled program at the beginning and presenting a currently received portion of the previously scheduled program.

11. The method of claim 1, further comprising:
presenting an indicator in response to the user's presentation request made via the presented EPG, wherein the indicator is configured to indicate presentation of the accessed initial portion of the previously scheduled program.

12. A media device, comprising:
a program content stream interface configured to receive at least one media content stream, wherein the media content stream includes a plurality of programs that are being currently received;
a memory medium communicatively coupled to the program content stream interface and configured to optionally store an initial portion of a previously scheduled program, wherein the previously scheduled program is one of the received plurality of programs, and wherein the initial portion of the stored previously scheduled program is stored as the previously scheduled program is received in the media content stream at the program content stream interface; and
a processor system communicatively coupled to the memory medium and the program content stream interface, wherein the processor system is configured to:
generate electronic program guides (EPGs) that are presented on a display to a user, wherein the EPGs indicate that the plurality of programs are currently scheduled for presentation, and wherein the previously scheduled program is listed in the EPGs as one of the plurality of programs that are currently scheduled for presentation;
receive, at the media device, a user request to store the previously scheduled program in the memory medium of the media device when the previously scheduled program is received at the media device;
receive a user's presentation request to present the previously scheduled program, wherein the user's presentation request for the requested previously scheduled program is based on the user navigating about a currently presented EPG and selecting the requested previously scheduled program via the currently presented EPG;
present a currently received portion of the requested previously scheduled program in the media content stream in response to the received user's presentation request, wherein the currently received portion of the requested previously scheduled program is presented when the initial portion of the previously scheduled program is not stored in the memory medium;
automatically access the stored initial portion of the previously scheduled program from the memory medium in response to the received user's presentation request made via the currently presented EPG when the initial portion of the previously scheduled program is stored in the memory medium; and
present the accessed initial portion of the previously scheduled program,
wherein the user's presentation request made via the currently presented EPG is received after the initial portion of the requested previously scheduled program has been received,
wherein the user's presentation request made via the currently presented EPG is received before a remaining portion of the requested previously scheduled program is received in the media content stream, and
wherein presentation of the initial portion of the requested previously scheduled program automatically begins in response to the user's presentation request made via the currently presented EPG.

13. The media device of claim 12, wherein the memory medium comprises:
a digital video recorder (DVR) memory medium communicatively coupled to the processor system, wherein the memory medium is configured to store the initial portion of the previously scheduled program as the program is received in the media content stream,
wherein the processor system automatically accesses the initial portion of the previously scheduled program from the DVR memory medium in response to receiving the user's presentation request made via the currently presented EPG.

14. The media device of claim 12, wherein a remote memory medium is communicatively coupled to the media device, and further comprising:
an interface communicatively coupled to the processor system,
wherein the processor system is further configured to communicate a request to the remote memory medium that at least the stored initial portion of the stored program be communicated to the media device,
wherein the request to the remote memory medium is communicated in response to the receiving of the user's presentation request made via the currently presented EPG, and wherein the request to the remote memory medium is communicated in response to determining that the initial portion of the requested previously scheduled program is not stored in the memory medium of the media device.

15. The media device of claim 12, wherein the memory medium is configured to store the remaining portion of the requested previously scheduled program received at the program content stream interface, wherein the remaining portion of the requested previously scheduled program is stored in response to the user's presentation request made via the currently presented EPG.

16. A method for presenting a previously scheduled program that is currently being received in a media content stream at a media device, the method comprising:
   receiving information that is used to generate electronic program guides (EPGs) at the media device, wherein the EPGs information identifies when the previously scheduled program will be presentable to a user;
   receiving a first user request to store the previously scheduled program in a memory medium of the media device, where the first user request is received prior to when the previously scheduled program will be presentable to the user;
   storing an initial portion of the previously scheduled program in the memory medium of the media device as the initial portion of the previously scheduled program is being received in the media content stream at the media device;
   generating an EPG at the media device in response to a second user request to present the EPG, wherein the EPG is generated after the first user request is received;
   presenting the EPG on a display to the user, wherein the presented EPG indicates that the previously scheduled program is currently scheduled for presentation;
   receiving a presentation request to present the previously scheduled program while a remaining portion of the previously scheduled program is being received in the media content stream at the media device, wherein the presentation request is based on the user navigating about the presented EPG and selecting the previously scheduled program via the presented EPG;
   accessing the initial portion of the previously scheduled program from the memory medium in response to receiving the user's presentation request made via the presented EPG when the initial portion of the previously scheduled program has been optionally stored in the memory medium; and
   presenting the initial portion of the previously scheduled program residing in the accessed initial portion of the previously scheduled program,
   wherein presentation of the initial portion of the requested previously scheduled program automatically begins in response to the user's presentation request made via the presented EPG.

17. The method of claim 16, further comprising:
   storing the remaining portion of the previously scheduled program in the memory medium of the media device in response to the user's presentation request made via the presented EPG,
   wherein the stored remaining portion of the previously scheduled program is presented upon conclusion of presentation of the initial portion of the previously scheduled program that has been accessed from the memory medium of the media device.

18. The method of claim 16, wherein an external memory medium is accessible by the media device, wherein the first user request to store the previously scheduled program causes the initial portion of the previously scheduled program to be stored in the external memory medium, and further comprising:
   communicating a request to an external device that the stored initial portion of the previously scheduled program be accessed from the external memory medium in response to the user's presentation request made via the presented EPG; and
   receiving the accessed initial portion of the previously scheduled program from the external memory medium.

19. The method of claim 18, further comprising:
   storing the remaining portion of the previously scheduled program received in the media content stream in the memory medium of the media device in response to the user's presentation request made via the presented EPG;
   accessing the remaining portion of the previously scheduled program from the memory medium of the media device upon conclusion of presentation of the initial portion of the previously scheduled program that has been received from the external memory medium; and
   presenting the remaining portion of the previously scheduled program.

* * * * *